(12) United States Patent
Watanabe et al.

(10) Patent No.: US 6,748,321 B2
(45) Date of Patent: Jun. 8, 2004

(54) NAVIGATION SYSTEM EQUIPPED WITH PORTABLE SUB-NAVIGATION UNIT

(75) Inventors: Tomoo Watanabe, Tsurugashima (JP); Tsuyoshi Sato, Tsurugashima (JP); Tamami Oda, Tsurugashima (JP); Yukitaka Saito, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 59 days.

(21) Appl. No.: 10/270,544

(22) Filed: Oct. 16, 2002

(65) Prior Publication Data

US 2003/0074135 A1 Apr. 17, 2003

(30) Foreign Application Priority Data

Oct. 17, 2001 (JP) ..................................... P2001-319446

(51) Int. Cl.[7] .............................................. G01C 21/34
(52) U.S. Cl. ........................ 701/209; 340/990; 701/211
(58) Field of Search ................................ 701/209, 202, 701/210, 200, 211, 213, 214; 340/988, 990, 995.1; 342/357.08, 357.1; 455/90.1, 12.1

(56) References Cited

U.S. PATENT DOCUMENTS 6,526,335 B1 * 2/2003 Treyz et al. .................... 701/1
6,633,809 B1 * 10/2003 Aizono et al. .............. 701/200

* cited by examiner

Primary Examiner—Marthe Y. Marc-Coleman
(74) Attorney, Agent, or Firm—Sughrue Mion, PLLC

(57) ABSTRACT

A navigation system comprises a navigation apparatus mounted on a vehicle and a portable information device communicable with the navigation apparatus based on a predetermined communication protocol. The navigation apparatus searches a route from a current position to a destination, and guides the searched route to the vehicle, that is, crews on board. The navigation apparatus further comprises a unit for searching a further route from a further current position to the destination in response to a predetermined command. The further current position is a position at which the unit searches the further route. The navigation apparatus further comprises a transfer unit for transferring information indicative of the further route to the portable information device. This device provides a person, who carries the device, with a further route guide by showing the further route, after the route guide performed by the navigation apparatus.

18 Claims, 6 Drawing Sheets

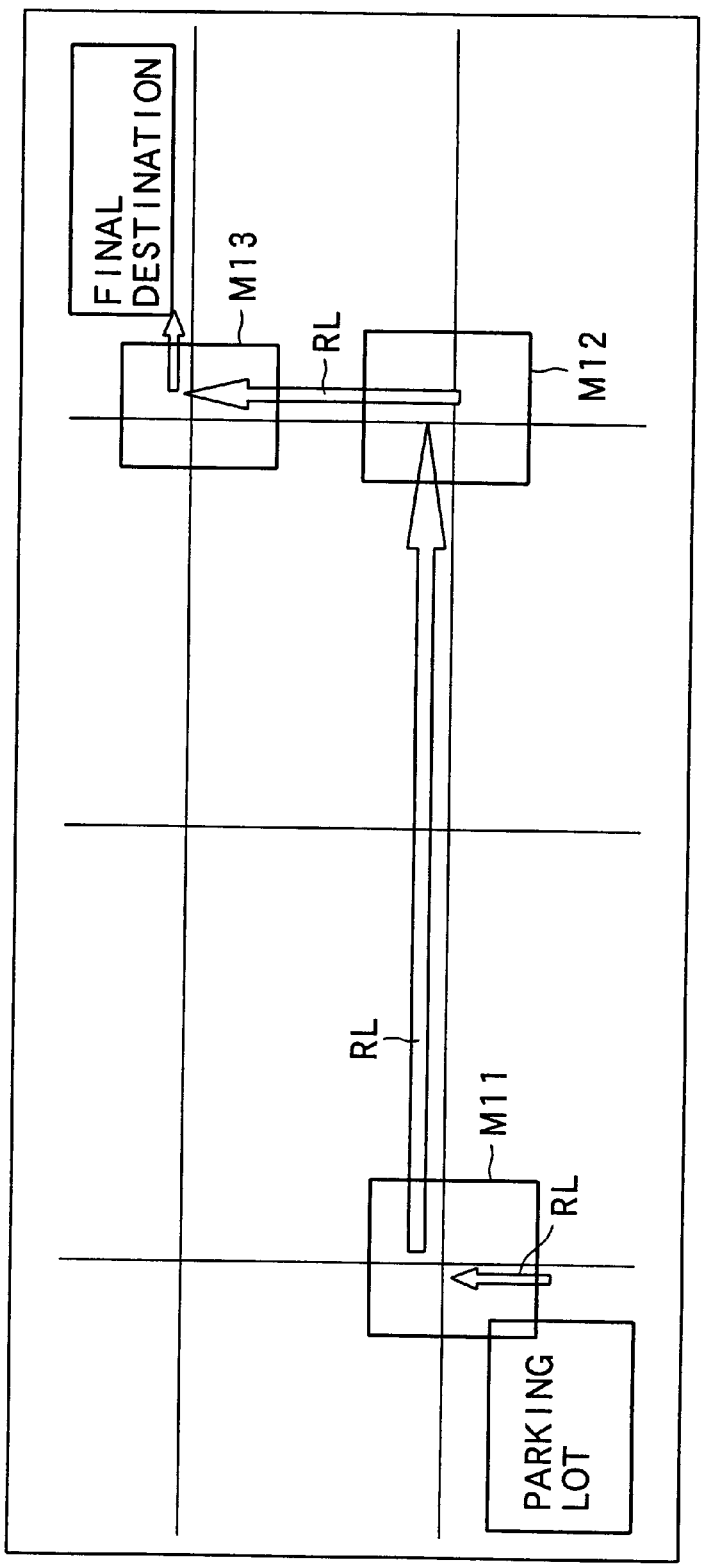

NAVIGATION SYSTEM EQUIPPED WITH PORTABLE SUB-NAVIGATION UNIT

BACKGROUND OF THE INVENTION

1. Field of the Invention

The present invention relates to a navigation system, and in particular, to a navigation system equipped with portable sub-navigation unit capable of still providing a route guide to a person who carries the sub-navigation unit.

2. Description of Related Art

In recent years, a navigation system for guiding a vehicle has widely used, where a display unit such as a liquid crystal display panel is mounted on the vehicle to display maps. One type of recent navigation systems, which has been eagerly researched for practical use, is a communicating navigation system. In this navigation system, there are provided an information server and on-vehicle navigation terminals. The information server has a database in which pieces of information about maps are stored. Pieces of map information are delivered to each on-vehicle navigation terminal by making use of mobile communication lines. Each on-vehicle terminal detects vehicle data (mobile data), such as vehicle's own position data, and provides crew members with pieces of information in relation to the navigation.

Meanwhile, portable terminals including a cellular phones and a PDA (personal digital assistance) have been in wide use.

In cases where the foregoing on-vehicle navigation terminal is used to simply guide the vehicle to a destination, the terminal is able to achieve the goal without any problems. However, such terminal encounters a problem, if facilities to be targeted are located far from a parking lot. The problem tends to be more frequent in inner-city districts or pleasure facilities. In such a case, the vehicle should be parked at the parking lot, and persons are obliged to go to the facilities (a final destination) on foot. Walking from the parking lot to the facilities may make persons worry about a further route guide to the facilities. There is even a fear that persons may be lost, if the route is complicated or in ordered good conditions.

SUMMARY OF THE INVENTION

The present invention has been made in view of the above circumstances, and an object of the present invention is, therefore, to provide a navigation system capable of, in addition to a route guide to a vehicle's stop position apart from a final destination, guiding a route from the vehicle's stop position to the final destination to a person in a steady manner, even when the vehicle's stop position is fairly distinct from the final destination.

In order to realize the above object, the present invention provides a navigation system having a first route search processing unit and a second route search processing unit. The first route search processing unit is configured to perform a first route search to produce map information to guide a first movable member carrying a navigation apparatus from a current position to a destination and to produce first-movable-member map information formed by laying route information on the map information. Meanwhile the second route search processing unit is configured to perform a second route search to produce further map information to guide a second movable member carrying a portable sub-navigation unit from a further current position to the destination and to produce second-movable-member map information formed by laying further route information on the further map information. The further current position is an instantaneous position at which the second route search is performed.

Accordingly, a route guide on the first-movable-member map information is provided from an initial current position toward a destination. In cases where the first movable member (for example, a vehicle) reaches a certain position (for example, a parking lot) but there is still a remaining route to the destination, a guide for the remaining route is continued by the use of the second-movable-member map information. In cases where the certain position is distant from the destination, a person is obliged to walk from the certain position to the destination. In such a case, the portable sub-navigation unit is able to steadily guide, to the person, the route between the certain position and the destination, with the possibility of losing person's way almost completely eliminated.

Preferably, the portable sub-navigation unit carried by the second movable member is a portable information device wire-less communicable with the navigation apparatus and the navigation system further comprises a transfer unit configured to transfer the second-movable-member map information to the portable information device. Thus, it is possible to display the second-movable-member map information on the portable information device.

Still preferably, the first movable member is a vehicle having an engine and the second route search processing unit is configured to automatically start the second route search in response to a turn-off operation of the engine of the vehicle. Hence, after a route guide obtained on the vehicle, a route guide by the portable information device is automatically started and continued.

It is preferred that the second route search processing unit is configured to produce the second-movable-member map information consisting of a plurality of maps formed depending on distances from the destination. In consequence, an easy-to-understand map information is given the person who walks toward the destination after getting off the vehicle.

It is also preferred that at least one of the plurality of maps solely includes both of the further current position and the destination in cases where each of the maps is displayed on a screen of the portable information device. The destination is displayed on the portable information device together with the further current position (i.e., a parking lot), thus providing overviewed map information to the person who carries the device.

By way of example, the plurality of maps are formed based on the same scale. It is therefore possible to give easy-to-observe maps to the person who carries the portable information device.

It is also preferred that the plurality of maps are formed into enlarged maps showing a predetermined region in which a route including a right-and-left-turn crossing is placed with the crossing located at a center of the region, the route being selected from routes searched by the second route search processing unit. Thus, easy-to-observe maps are provided to the person who carries the portable information device.

Further, preferably, the second route search processing unit is configured to produce each of the plurality of maps so as to show a travel direction of the second movable member upward on a display screen of the portable information device. Maps are thus easier for the person to view.

Still further, it is preferred that the second route search processing unit is configured to produce each of the plurality of maps so as to display on each map information about a transit time to be expected, in cases where the second movable member travels along a route guided by the second route search processing unit. Thus, easy-to-observe maps are provided to the person who carries the portable information device.

It is also preferred that the second route search processing unit is configured to additionally perform search a route from the destination to the further current position. Therefore, even when the person who carries the portable information device returns from the destination to, for example, a parking lot at which a person's vehicle is parked (i.e., the further current position), a route guide is surely provided to the person who carries the device.

According to the present invention, as other aspects, a navigation method, a program for navigation, and an information recording medium for navigation are provided. As a result, the same or identical operations and advantages as or to the above primary ones can be provided.

BRIEF DESCRIPTION OF THE DRAWINGS

Other objects and aspects of the present invention will become apparent from the following description and embodiments with reference to the accompanying drawings in which:

FIG. 6 is an illustration depicting a second map producing technique adopted by the navigation processing according to the embodiment.

DETAILED DESCRIPTION OF THE PREFERREDEMBODIMENT

The present invention will now be described with reference to preferred embodiment.

In the following embodiment, the present invention is reduced into practice a navigation system including an on-vehicle navigation apparatus and a terminal. The on-vehicle navigation apparatus, which is mounted on a vehicle, is in charge of performing various types of processing, such as route search processing, storage and delivery of map information, and storage and delivery of positional information, all pieces of information are required for navigation of a vehicle. The terminal, made into a portable type, has the capability of communicating with the on-vehicle navigation apparatus by a short-range wireless communication technique as well as receiving results of the route search processing and information about maps, in order to perform a guide toward the owner thereof (hereinafter, referred as a pedestrian).

Figure 1:
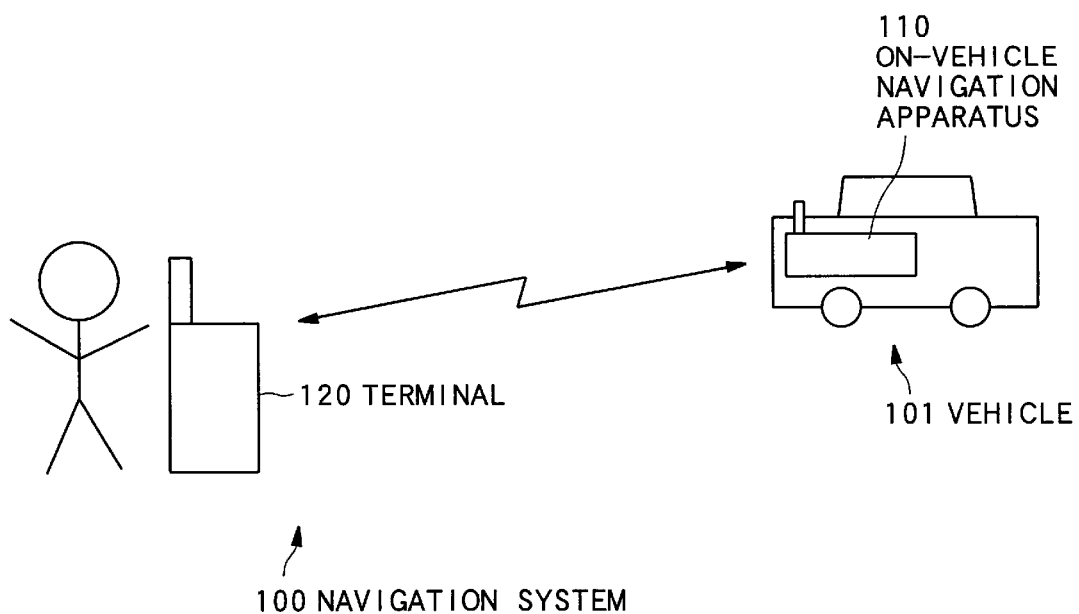
FIG. 1 is a block diagram showing an outlined configuration of a navigation system according an embodiment of the present invention.

With reference to FIG. 1, the navigation system according to the embodiment will be outlined and its operations will be explained.

As shown in FIG. 1, the navigation system 100 is equipped with an on-vehicle navigation apparatus 110 and an terminal 120 serving as a portable information device, such as a PDA, and both of the apparatus 110 and the terminal 120 are communicable with each other based on a short-range wireless communication technique. The on-vehicle navigation apparatus 110 is mounted on a vehicle 101 (serving as a first movable member) and is responsible for various kinds of processing such as route search processing necessary for navigation carried out the terminal.

The on-vehicle navigation apparatus 110 calculates vehicle travel data from information indicative of a destination given by a crew on the vehicle 101, positional information indicative of the vehicle 101 acquired with the aid of GPS (Global Positioning System) data that has been received, and signals from various types of sensors such as a vehicle speed pulse outputting unit, accelerator sensor, vibration sensor, and gyro sensor. Based on the vehicle travel data, the vehicle navigation apparatus 110 carries out "navigation processing" for the vehicle 101, i.e., processing to guide a route or others to the crews on the vehicle 101.

On the other hand, the terminal 120 is used to guide the person (corresponding to a second movable member) who has the terminal 120 through transmission and reception of searched results to and from the vehicle navigation apparatus 110. More practically, the terminal 120 receives data that has been processed by the on-vehicle navigation apparatus 110 (hereafter referred to as "navigation data") and carries out the navigation processing toward the person. The navigation data is for example information indicating results of searched routes and route guides.

Both of the on-vehicle navigation apparatus 110 and the terminal 120 are mutually communicable in a wireless manner based on short-range wireless communication, which is, for example, the "Bluetooth (a trademark owned by Telefonaktiebolaget L M Ericsson)." This standard is at present under formulation IEEE (Institute of Electrical and Electronic Engineers) 802.15.

Figure 2:
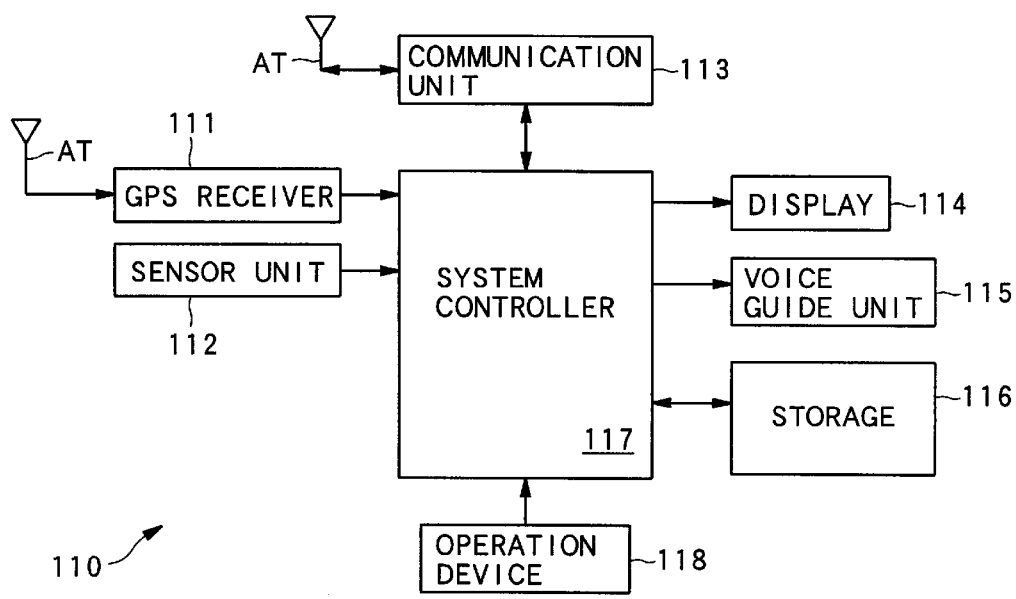
FIG. 2 shows in a block form the configuration of an on-vehicle navigation apparatus according to the embodiment.
Figure 3:
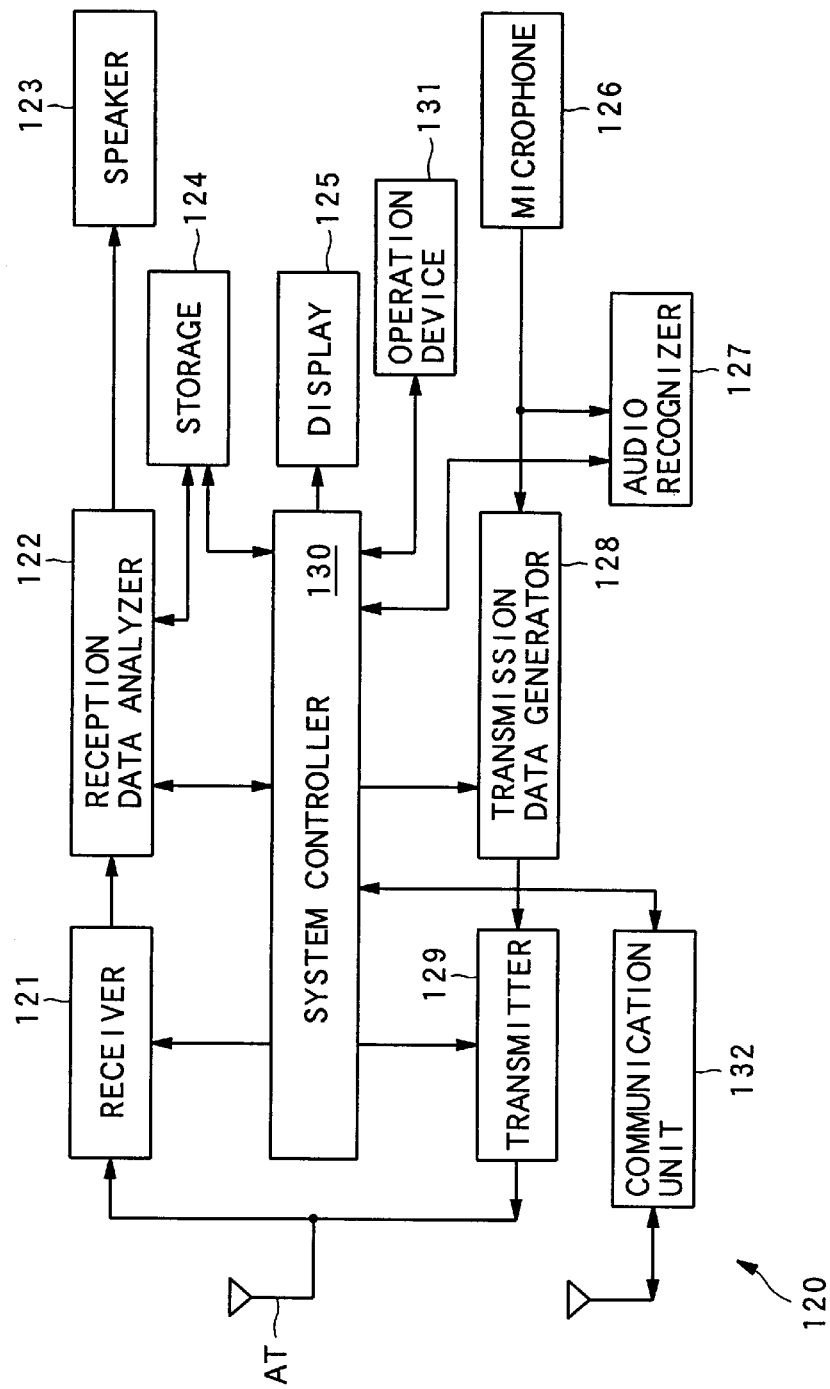
FIG. 3 shows in a block form the configuration of a terminal according to the embodiment.

With reference to FIGS. 2 and 3, each constituent of the on-vehicle navigation apparatus 110 and terminal 120 will now be detailed.

FIG. 2 details in a block form the on-vehicle navigation apparatus 110, while FIG. 3 details in a block form the terminal 120.

As shown in FIG. 2, the on-vehicle navigation apparatus 110 includes a GPS receiver 111, sensor unit 112, communication unit 113, display 114, voice guide unit 115, storage 116, system controller 117, and operation device 118.

Of these constituents, the receiver GPS 111 is connected to an antenna AT and receives GPS data. The sensor unit 112 includes a speed/acceleration sensor to detect a running speed and an acceleration of a vehicle and azimuthal angle sensor to detect an azimuthal angle of the vehicle. The communication unit 113, also connected to the antenna AT, serves as transferring means and is responsible for radio communication to and from the terminal 120 based on the foregoing standard of Bluetooth (trademark). Not only map information but also navigation data are displayed on the display 114. The received navigation data is used by the voice guide unit 115 to guide routes of a vehicle with voice massages. The storage 116 is used to temporarily memorize data, such as the received navigation data. Based on the received navigation data and stored navigation data in the storage 116, the system controller 117 carries out control of both the display 114 and the voice guide unit 115, thus serving as first and second route processing means. The operation device 118 is used to give commands to each constituent described above.

Like a communication unit 132 incorporated in the terminal 120, an address on the Bluetooth (trademark) (hereafter referred to as "BT address") is previously assigned to the communication unit 113. The communication unit 113 is specified as being a master apparatus on the standard of Bluetooth (trademark).

Referring to FIG. 3, the configurations of the terminal 120 will now be described. As shown in FIG. 3, the terminal 120 includes a receiver 121, reception data analyzer 122, speaker 123, storage 124, display 125, microphone 126, audio recognizer 127, transmission data generator 128, transmitter 129, system controller 130, operation device 131, and communication unit 132.

Of these constituents, the receiver 121 coupled with an antenna AT is able to receive communication data including audio data associated with telephone calls. The reception data analyzer 122 analyzes types of data to output analyzed data to each unit necessary in the terminal 120. When the receiver 121 receives the audio data, the speaker 123 outputs audio massages in response to the reception and the storage 124 memorizes the audio data. The display 125 visualizes the data received by the receiver 121. The microphone 126 is used to allow a pedestrian to input voice massages. The voice massages that have been given to the microphone 126 are analyzed by the audio analyzer 127. The voice data obtained by the microphone 126 is also sent to the transmission data generator 128 to produce transmission data. The transmitter 129 is in charge of transmitting transmission data and others to the information server 110. The data that has been received and stored by the storage 124 is used by the system controller 130 to control each constituent as well as control connection processing to and from the terminal 120. The operation device 131 is used to operate each constituent. The communication unit 132 is in charge of radio communication to and from the on-vehicle navigation apparatus 110 on the basis of the foregoing standard of "Bluetooth (trademark)."

A BT address on the standard of Bluetooth (trademark) is previously assigned to the communication unit 132.

According to the standards on Bluetooth (trademark), a link, called a Piconet, to connect communication apparatuses to each other is required to carry out radio communication. Basically, the single Piconet mutually connects a single communication apparatus and a plurality of slave communication apparatuses. The Piconet is configured according to a series of predetermined connection procedures including an inquiry step and a paging step. The inquiry step is to inquire whether or not there are some apparatuses with which the master communication apparatus communicates on the standards on Bluetooth (trademark) within a communicable range of the master communication apparatus. The paging step is placed to permit the master communication apparatus to acquire a BT address from a slave communication apparatus in order to establish a communicable state therebetween.

In the present embodiment, the foregoing on-vehicle navigation apparatus is assigned to the master communication apparatus in advance. With the inquiry step omitted, only the paging step is used to constitute the Piconet by linking the terminal 120 to the on-vehicle navigation apparatus 110. This Piconet is in charge of communication of various types of pieces of information, such as search information, as will be described later.

Figure 4:
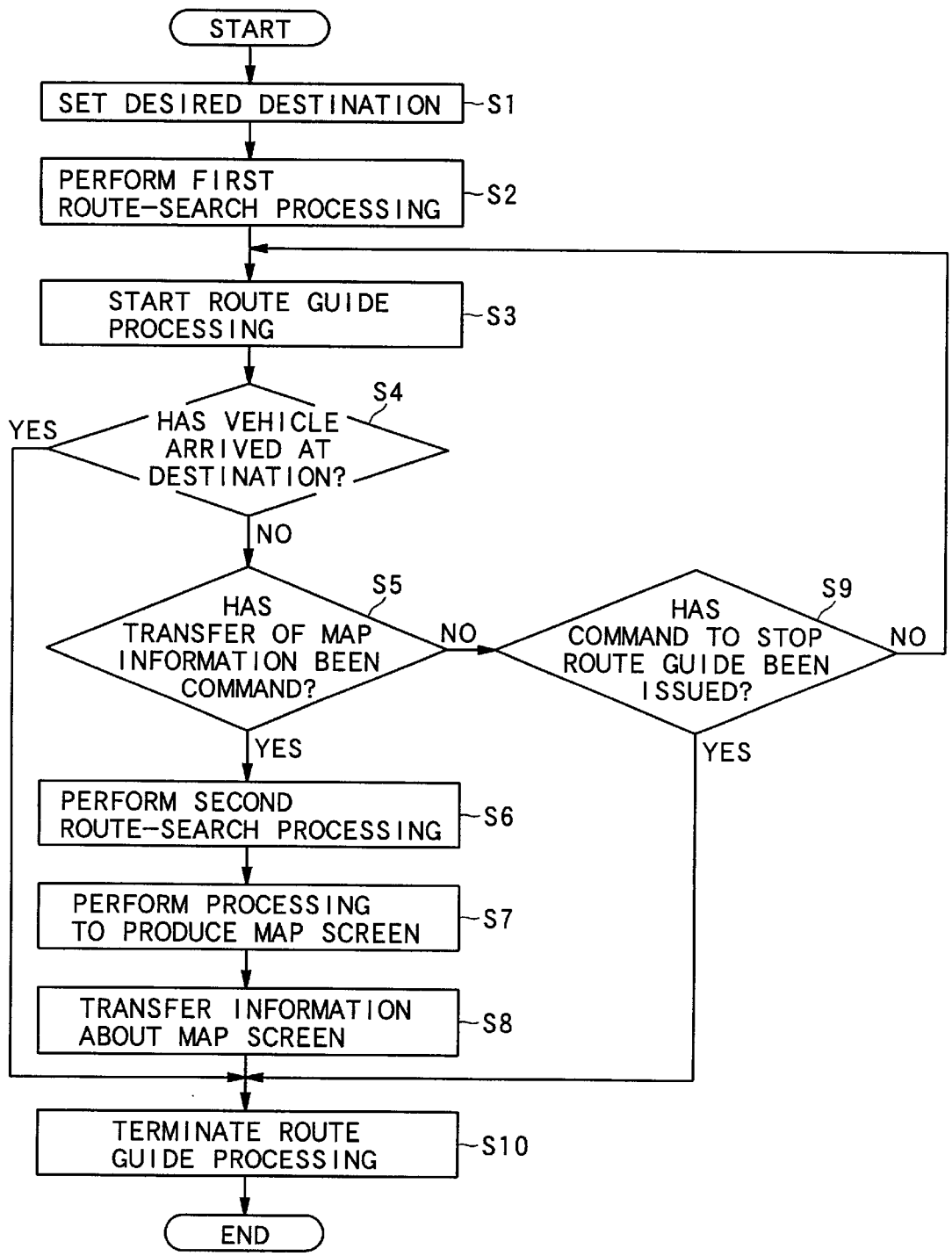
FIG. 4 is a flowchart illustrating navigation processing carried out in the embodiment.

Referring to FIG. 4, the navigation processing carried out by the navigation system 100 in the present embodiment will now be described. The navigation system 100 is linked by the Piconet.

In the present embodiment, the navigation processing is executed for a former route guide, and then, if necessary, executed for a last route guide. The former route guide is realized by the on-vehicle navigation apparatus 110 through navigation processing to guide routes to the crews until the vehicle 101 arrives at a specified position (referred to as a "destination-nearer position") nearer to a finally desired destination (i.e., a final destination). And if the on-vehicle navigation apparatus 110 receives a command for transferring map information from the "destination-nearer position" to the final destination, the last route guide is executed. In cases where the last route guide is executed, pieces of information about maps are communicated between the on-vehicle navigation apparatus 110 and the terminal 120, so that routes from the destination-nearer position to the final destination are shown to the pedestrian who has the terminal 120.

As shown in FIG. 4, the on-vehicle navigation apparatus 110 first carries out the processing for specifying a desired destination (final destination), and then carries out first route search processing (steps S1 and S2). The first route search processing at step S2 is that map information required to guide routes to crews on the vehicle 101 from the current position to the specified destination is first produced, and then owner's map information formed by superposing route information on the produced map information is produced. This former route search processing is continued until the final destination. In the case that the final destination ties up with a parking lot, the former route search processing is kept to continue until the parking lot.

Then, by the on-vehicle navigation apparatus 110, route guide processing is executed (step S3). Based on GPS data obtained from the GPS receiver 111 of the on-vehicle navigation apparatus 110, it is then determined whether or not the vehicle 101 has arrived at the final destination (step S4). When the vehicle 101 has arrived at the final destination (i.e., YES at step S4), the processing of the apparatus 110 is made to go to step S10 to terminate the route guide processing.

Meanwhile, if the determination at step S4 shows that the vehicle 101 has yet to arrive at the final destination and still been at "destination-nearer position" (NO at step S4), the processing proceeds to step S5. At step S5, it is further determined if a command for transfer of map information to the terminal 120 has been issued or not. Specifically, the command indicates that information in relation to maps ranging from the "destination-nearer position" to the final destination is transferred from the on-vehicle navigation apparatus 110 to the terminal 120 on the standards on Bluetooth (trademark). In cases where the above transfer command has been issued (YES at step S5), the on-vehicle navigation apparatus 110 makes its processing proceed to step S6, where a second route search processing is performed.

The second route search processing is performed while the route guide performed based on the first route search processing is in operation. To be specific, map information to guide to the pedestrian the routes from the current position to the final destination, and pedestrian's map information is produced in which route information is superposed on the already produced map information. Accordingly, this route search processing provides on-foot routes to the pedestrian who has the terminal 120, where the searched routes are shown in consideration of various factors, such as sidewalks, pedestrian bridges, and footways.

By way of example, the second route search processing at step S6 is launched in response to a stop of the engine of the vehicle 101, so that the foregoing transfer command is issued. This way of transfer makes it possible to automatically transfer the map information to the terminal 120.

The on-vehicle navigation apparatus 110 then performs the processing for producing a map image (step S7). This map-image production processing is responsible for the production of a plurality of map images showing maps from the current position (i.e., destination-nearer position) to the final destination. How to produce the map images will be described later.

The information in relation to map images produced at step S7 is transferred from the on-vehicle navigation apparatus 110 to the terminal 120 (step S8), before terminating the route guide processing by means of on-vehicle navigation apparatus 110 (step S10).

On the other hand, there is no transfer command of the map information at step S5 and a command to stop the route guide has been issued (YES at step S9), the processing is made to go to step S10 to terminate the rouge guide processing. In contrast, the route-guide stop command has not been issued (NO at step S9), the processing at the apparatus 110 is returned to step S3.

Accordingly, the navigation system 100 of the present embodiment provides the first route search processing at step S2, where map information to guide the vehicle 101 from the current position to the final destination is produced, and map information for the vehicle 101, in which vehicle's routes are superposed on the maps, is produced. During the route guide performed based on the first route search processing, the second route search processing is carried out at step S6 as follows. In other words, map information to guide the pedestrian from the current position to final destination is produced, and map information for the pedestrian, in which pedestrian routes are laid on maps, is produced. Thus, after a route guide (i.e., the former route guide) to the "destination-nearer position" on the basis of the first route search processing, a further rouge guide (i.e., the last route guide) from the "destination-nearer position" to the final destination is performed based on the second route search processing.

As a result, even when the user is not able to access to the final destination by means of the user's vehicle and is obliged to walk to the final destination, because of, for example, the parking lot is distant from the final destination, the user can rely on the terminal 120. The terminal 120 is able to provide a reliable route information to the pedestrian, reducing the fear that the pedestrian may lose one's way.

In addition, the on-vehicle navigation apparatus 110 is provided with the communication unit 113 capable of transferring, to the terminal 120, map information dedicated to the pedestrian and the map information is displayed on the display 125 of the terminal 120. The route guide on the display 125 allows the pedestrian to walk from the destination-nearer position to the final destination in a steadier manner, without losing the pedestrian's way.

The information about maps is radio-transferred from the on-vehicle navigation apparatus 110 to the terminal 120 based on the standards on Bluetooth (trademark), with the result that various kinds of information such as searched information can be transmitted in an easier manner.

Further, the on-vehicle navigation apparatus 110 is combined with the portable terminal 120 for a continuous use. This makes it possible that the route guide to the final destination is continuously and steadily performed during both periods of travel by the vehicle 101 and on foot.

Still further, preferably, when the engine of the vehicle 101 is turned off, the second route search processing is automatically carried out at step S6 in FIG. 4. The guide to the crews on the vehicle 101 can therefore be followed by the guide to the pedestrian who uses the terminal 120 automatically and without a rest. Thus, maps and route information can be displayed on the display 125 of the terminal 120, without particular cumbersome operations for the guide on the terminal 120.

Figure 5:
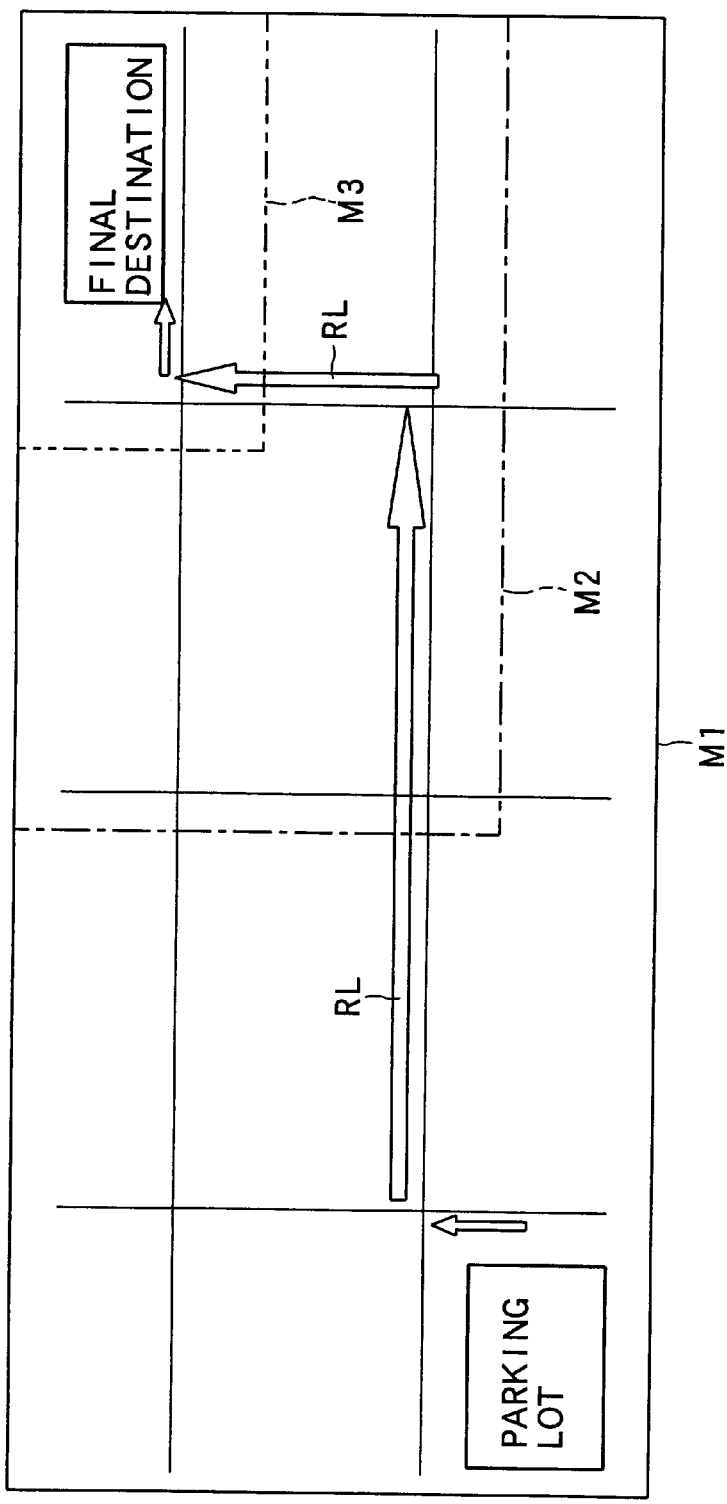
FIG. 5 is an illustration depicting a first map producing technique adopted by the navigation processing according to the embodiment.

How to produce a map, which is carried out at step S7 in the navigation processing of FIG. 4, will now be described. FIG. 5 shows a first technique of producing a map, while FIG. 6 shows a second technique of producing a map.

The first map producing technique shown in FIG. 5 adopts three scale maps to be handled as map information to be transmitted. These three scale maps is composed of, for instance, a first map M1, a second map M2, and a third map M3. On the first map M1, the current position (i.e., a parking lot) and a final destination are depicted. The second map M2 depicts from a position, at which the pedestrian who has the terminal 120 is present after a walk of a predetermined distance, to the final destination. Further, the third map M3 shows the vicinity of the final destination.

For transferring information about maps from the on-vehicle navigation apparatus 110 to the terminal 120, a crew is to push a map transmission button on the operation device 118 of the apparatus 110 when the vehicle 101 stops at a destination-nearer position. The system controller 117 of the on-vehicle navigation apparatus 110 will respond to the push operation. Specifically, the system controller 117 calculates a distance from the current position to the final destination. Based on the calculated distance, the system controller 117 prepares the foregoing first, second, and third maps M1 to M3 (i.e., the three scale maps), and performs route search processing. This route search is executed in consideration of routes through which a pedestrian who has the terminal 120 is able to walk. Then the system controller 117 depicts a route guide line RL on the map in order to show the spots, places and routes through which the pedestrian can walk.

The above first to third maps M1 to M3 are produced depending on different distances from the final destination. Examples are such that the first, second and third maps M1, M2 and M3 are produced as maps apart from the final destination by 500 m, 300 m and 100 m, respectively.

Furthermore, when displaying the map information on the terminal 120, it is possible that any one map is selected from the first to third maps M1 to M3 with consideration of a waling speed of a pedestrian who has the terminal 120. And the selected map is displayed, in an automatically switched manner, on the terminal 120 at that selection timing.

Other than the switchovers of the maps M1 to M3 based on the pedestrian's walking speed, the pedestrian's manual operations can be adopted. That is, the navigation system can be configured such that the pedestrian operates the operation device 131 of the terminal 120 when desired, in order to selectively display any one of the first to third maps M1 to M3 on the display 125.

The maps that have been produced are divided into three stages depending on different scales determined by distances from the final destination, thus providing a desired map to the pedestrian in accordance with the pedestrian's current position. Thus, an easy-to-understand guide map is always given the pedestrian who walks toward the final destination.

Additionally, of the three pieces of map information, that is, the first to third maps M1 to M3, the first map M1, which is provided at the timing when the second route search processing is performed at step S6 in FIG. 4, provides both of the current position and a final destination of the vehicle 101 on the same display screen of the terminal 120. Accordingly, observing the first map M1 enables the pedestrian to easily understand the final destination in comparison with the current position of the vehicle 101.

Moreover, the first to third maps M1 to M3 are produced according to distances between the current positions, which are obtained at the timings when the second route search processing is performed at step S6 in FIG. 4, and a final destination. It is therefore possible to provide pieces of information about maps that allow the pedestrian to understand the routes from the current position to a final destination in an easier fashion.

The second map producing technique will now be described with reference to FIG. 6.

The second map producing technique shown in FIG. 6 uses detailed information about three crossings, which corresponds to transmission map information. These plural crossing maps are composed of, for example, a first map M11, a second map M12 and a third map M13. The first map M11 is a detailed map depicting a first right and left turn crossing, the second map M12 is a detailed map showing a second right and left turn crossing, and the third map M13 is a detailed map showing a third right an left turn crossing.

All of the first to third maps M11 to M13 are produced on the same scale and depict enlarged areas in each of which a right and left turn crossing is centered. The right and left turn crossing is selected from various crossings searched by the second route search processing at step S6.

For transferring map information from the on-vehicle navigation apparatus 110 to the terminal 120, a crew is to push a map transmission button on the operation device 118 of the apparatus 110 when the vehicle 101 stops at a destination-nearer position. The system controller 117 of the on-vehicle navigation apparatus 110 will respond to the push operation. Specifically, the system controller 117 calculates a route from the current position to the final destination. Based on the calculated route, the system controller 117 prepares maps of right and left turn crossings that should be on the first to third maps M11 to M13.

The maps thus produced shows in detail a plurality of crossings at which the pedestrian will turn to the right or left during the pedestrian's walk to the final destination. Hence, the easy-to-understand maps can be provided to the pedestrian.

The first to third maps M11 to M13 are all produced on the same scale, thus providing the easy-to-understand maps to the pedestrian.

The first to third maps M11 to M13 depict enlarged areas in each of which a right and left turn crossing is centered. The right and left turn crossing is selected from various crossings searched by the second route search processing at step S6. It is therefore possible to provide the pedestrian with easier-to-understand maps.

The present embodiment can be reduced into practice in various other modified configurations.

The second map producing technique shown in FIG. 6 is directed to the production of maps at every point only. Hence it is desirable that the pedestrian be informed of a switchover timing, for example, from the first map M11 to the second map M12. By way of example, this information of a switchover timing is carried out such that a period of time from the present time to the next switchover display of maps is calculated in consideration of a walking speed of the pedestrian and displayed on the display 125 of the terminal 120.

That is, on condition that the pedestrian travels along the routes obtained by the second route search processing, it is preferred that each of the first to third maps M11 to M13 display, in a superposition manner, pieces of information indicating which time the pedestrian passes the locations shown by the maps. This way of display provides the map information which can be understood more easily.

Furthermore, the first map producing technique shown in FIG. 5 and the second map producing technique shown in FIG. 6 may be combined in such a manner that both techniques are automatically switched over with each other in consideration of a walking speed of a pedestrian. This communication will give pedestrians steadier route guide information. In this configuration, a pedestrian may operate the operation device 131 of the terminal 120 at desired timings so that the first to third maps on the display 125 are switched over one from another, like the switchover technique of the maps described before.

Further, in the case that the maps shown in FIGS. 5 and 6 are presented on the display 125 of the terminal 120, it is desirable to configure the terminal 120 such that a direction along which a pedestrian walks be depicted upward on the screen of the display 125. Under this displaying configuration, in cases where a pedestrian, who walks, enters into an area indicated by each of the first to third maps, the waking direction always becomes upward on the display screen. This way of displaying the maps is also very easy-to-understand for pedestrians.

Still further, it is also preferable to configure both the on-vehicle navigation apparatus and the terminal 120 in such a manner that, for route guide when returning, maps from the final destination to the parking lot are previously produced at the second route search processing at step S6. In this configuration, a preferable display technique is that a walking direction of a pedestrian is displayed downward, or opposite to the foregoing upward direction, on the display 125. Accordingly, when the second route search processing is carried out in approaching to the final destination, the route search from the final destination to the position in returning to the parking lot is carried out as well. This route guide in the return to the parking lot is helpful to the pedestrian, with the possibly of losing the pedestrian's way reduced, thus giving a sense of safe to the pedestrian.

A further modification can be practiced in a mobile navigation apparatus that makes use of communication means, instead of the foregoing on-vehicle navigation apparatus 110 fixedly mounted on the vehicle.

A still further concerns a control configuration in the navigation system. To be specific, the program shown by the flowchart shown in FIG. 4 is stored in such information recording mediums as a flexible disk or a hard disk, or delivered to a computer system though such networks as the Internet. The program is then read out by a computer (such as a universal microcomputer) equipped with the on-vehicle navigation apparatus 110 or the terminal 120, instead of the system controller 117 or 130, and then executed. Thus, such a computer is able to function as the system controller 117 or 130.

The present invention may be embodied in other specific forms without departing from the spirit or essential characteristics thereof. The above embodiments and modifications are therefore to be considered in all respects as illustrative and not restrictive, the scope of the present invention being indicated by the appended claims rather than by the foregoing description and all changes which come within the meaning and range of equivalency of the claims are therefore intended to be embraced therein. For example, in the above embodiment, the portable sub-navigation unit according to the present embodiment has been implemented as a terminal which is a portable information device such as a PDA. Alternatively, the portable sub-navigation unit can be implemented by other portable devices such as portable phones.

The entire disclosure of Japanese Patent Application No. 2001-319446 filed on Oct. 17, 2001 including the specification, claims, drawings and summary is incorporated herein by reference in its entirety.

What is claimed is:

1. A navigation system comprising:
    a first route search processing unit configured to perform a first route search to produce map information to guide a first movable member carrying a navigation apparatus from a current position to a destination and to produce first-movable-member map information formed by laying route information on the map information; and
    a second route search processing unit configured to perform a second route search to produce further map information to guide a second movable member carrying a portable sub-navigation unit from a further current position to the destination and to produce second-movable-member map information formed by laying further route information on the further map information, the further current position being an instantaneous position at which the second route search is performed.

2. The navigation system of claim 1, wherein the portable sub-navigation unit carried by the second movable member is a portable information device wire-less communicable with the navigation apparatus,
    further comprising a transfer unit configured to transfer the second-movable-member map information to the portable information device.

3. The navigation system of claim 1, wherein the first movable member is a vehicle having an engine and the second route search processing unit is configured to automatically start the second route search in response to a turn-off operation of the engine of the vehicle.

4. The navigation system of claim 1, wherein the second route search processing unit is configured to produce the second-movable-member map information consisting of a plurality of maps formed depending on distances from the destination.

5. The navigation system of claim 4, wherein at least one of the plurality of maps solely includes both of the further current position and the destination in cases where each of the maps is displayed on a screen of the portable information device.

6. The navigation system of claim 4, wherein the plurality of maps are formed based on the same scale.

7. The navigation system of claim 4, wherein the plurality of maps are formed into enlarged maps showing a predetermined region in which a route including a right-and-left-turn crossing is placed with the crossing located at a center of the region, the route being selected from routes searched by the second route search processing unit.

8. The navigation system of claim 4, wherein the second route search processing unit is configured to produce each of the plurality of maps so as to show a travel direction of the second movable member upward on a display screen of the portable information device.

9. The navigation system of claim 4, wherein the second route search processing unit is configured to produce each of the plurality of maps so as to display on each map information about a transit time to be expected, in cases where the second movable member travels along a route guided by the second route search processing unit.

10. The navigation system of claim 1, wherein the second route search processing unit is configured to additionally perform search a route from the destination to the further current position.

11. A navigation method comprising the steps of:
    performing a first route search to produce map information to guide a first movable member carrying a navigation apparatus from a current position to a destination and to produce first-movable-member map information formed by laying route information on the map information; and
    performing a second route search to produce further map information to guide a second movable member carrying a portable sub-navigation unit from a further current position to the destination and to produce second-movable-member map information formed by laying further route information on the further map information, the further current position being an instantaneous position at which the second route search is performed.

12. The navigation method of claim 11, wherein the portable sub-navigation unit carried by the second movable member is a portable information device wire-less communicable with the navigation apparatus,
    further comprising a step of transferring the second-movable-member map information to the portable information device.

13. A program readable by a computer incorporated in a navigation system provides the functions of:
    performing a first route search to produce map information to guide a first movable member carrying a navigation apparatus from a current position to a destination and to produce first-movable-member map information formed by laying route information on the map information; and
    performing a second route search to produce further map information to guide a second movable member carrying a portable sub-navigation unit from a further current position to the destination and to produce second-movable-member map information formed by laying further route information on the further map information, the further current position being an instantaneous position at which the second route search is performed.

14. The program of claim 13, further providing a function of transferring the second-movable-member map information to the portable sub-navigation unit.

15. An information recording medium in which the program of claim 13 is recorded.

16. A navigation system, comprising:
    a navigation apparatus for providing a first movable member with a route guide by showing a route from a current position to a destination; and
    a portable sub-navigation unit for providing a second movable member with a further route guide by showing a further route from a further current position to the destination, after the route guide performed by the navigation apparatus.

17. The navigation system of claim 16, wherein the navigation apparatus comprises
    a first route search processing unit for searching the route from the current position to the destination;

a route guiding unit for guiding the searched route to the first movable member;

a second route search processing unit for searching the further route from the further current position to the destination in response to a predetermined command; and a transfer unit for transferring information indicative of the further route to the portable sub-navigation unit.

18. The navigation system of claim 17, wherein the first movable member is a vehicle on which the navigation apparatus is mounted and the portable sub-navigation unit is a portable information device carried by the second movable member and wireless-communicable with the navigation unit based on a predetermined communication protocol.

* * * * *